United States Patent
Roessl et al.

(10) Patent No.: US 9,881,710 B2
(45) Date of Patent: Jan. 30, 2018

(54) ACHROMATIC PHASE-CONTRAST IMAGING

(75) Inventors: Ewald Roessl, Ellerau (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/260,424

(22) PCT Filed: Mar. 19, 2010

(86) PCT No.: PCT/IB2010/051198
§ 371 (c)(1),
(2), (4) Date: Sep. 27, 2011

(87) PCT Pub. No.: WO2010/109390
PCT Pub. Date: Sep. 30, 2010

(65) Prior Publication Data
US 2012/0020461 A1   Jan. 26, 2012

(30) Foreign Application Priority Data
Mar. 27, 2009  (EP) .................................... 09156457

(51) Int. Cl.
*G21K 1/06*  (2006.01)
*G02B 27/52*  (2006.01)

(52) U.S. Cl.
CPC ............... *G21K 1/06* (2013.01); *G02B 27/52* (2013.01); *G21K 2207/005* (2013.01)

(58) Field of Classification Search
CPC .... G21K 1/06; G21K 2207/005; G21K 1/067; G21K 2201/06; G21K 1/025; G21K 2201/067; G21K 1/02; A61B 6/484; A61B 6/4291; A61B 6/502; A61B 6/4035; A61B 6/06; A61B 6/4021; A61B 6/4233; A61B 6/4441; A61B 6/4464; A61B 6/0407; A61B 6/0414; A61B 6/4078; A61B 6/4092; A61B 6/4452; A61B 6/508; A61B 6/54;
(Continued)

(56) References Cited

U.S. PATENT DOCUMENTS 5,812,629 A  *  9/1998  Clauser .......................... 378/62
7,180,979 B2 *  2/2007  Momose ........................ 378/62
(Continued)

FOREIGN PATENT DOCUMENTS

| CN | 101036582 | 9/2007 |
| EP | 1447046 A1 | 8/2004 |
| JP | 2007203064 A | 8/2007 |

OTHER PUBLICATIONS

F. Pfeiffer et al: "Phase Retrieval and Differential Phase-Contrast Imaging With Low-Brilliance X-Ray Sources" Nature Physics, Nature Publishing Group, London, GB LNKD-DOI:10.1038/NPHYS265, vol. 2, Mar. 26, 2006, pp. 258-261, XP002518081ISSN: 1745-2473 [retrieved on Mar. 5, 2009].
(Continued)

*Primary Examiner* — Glen Kao

(57) ABSTRACT

An achromatic phase-contrast imaging apparatus for examining an object of interest is provided which comprises two different phase gratings which have different pitches. Thus, the imaging apparatus yields phase-contrast information for two different energies. Thus, phase-information over a wider energy band can be used.

14 Claims, 3 Drawing Sheets

(58) Field of Classification Search
CPC .......... A61B 6/583; G01D 5/38; G01D 18/00;
G01D 5/24476; G01D 5/2457; G01D
5/34; G01D 5/34707; G01D 5/3473;
G01D 5/366; G01D 5/35303; G01D
5/34746; G02B 21/14; G02B 21/0056;
G02B 27/52; G01J 9/02
USPC ................................. 378/62, 84, 85, 87, 145
See application file for complete search history.

(56) References Cited

U.S. PATENT DOCUMENTS

| | | | | |
|---|---|---|---|---|
| 7,532,704 | B2* | 5/2009 | Hempel | 378/19 |
| 7,639,786 | B2* | 12/2009 | Baumann et al. | 378/145 |
| 9,445,775 | B2 | 9/2016 | Das | |
| 2003/0152197 | A1* | 8/2003 | Moyers | A61B 6/0407 378/204 |
| 2007/0183560 | A1* | 8/2007 | Popescu et al. | 378/5 |
| 2007/0183582 | A1* | 8/2007 | Baumann | A61B 6/484 378/145 |
| 2008/0117494 | A1 | 5/2008 | Noordman et al. | |
| 2009/0316857 | A1* | 12/2009 | David et al. | 378/62 |
| 2010/0027739 | A1* | 2/2010 | Lanza | G02B 27/52 378/37 |
| 2010/0080436 | A1* | 4/2010 | Ohara | A61B 6/06 378/62 |
| 2010/0327175 | A1 | 12/2010 | Nesterets | |
| 2012/0099702 | A1 | 4/2012 | Engel et al. | |
| 2014/0177789 | A1 | 6/2014 | Baturin et al. | |
| 2015/0323439 | A1 | 11/2015 | Monaghan | |
| 2016/0254069 | A1 | 9/2016 | Preusche | |
| 2017/0025247 | A1 | 1/2017 | Stevens | |
| 2017/0069675 | A1 | 3/2017 | Gill | |
| 2017/0146466 | A1 | 5/2017 | Stutman | |

OTHER PUBLICATIONS

Paul Scherrer Instit Grating Fabrication, http://www.psi.ch/lmn/grating-fabrication, Downloaded Dec. 1, 2014, 2 pages.
Berry, M.V. et al, "Integer, fractional and fractal Talbot effects", Journal of Modern Opticals, 1996, vol. 43, No. 10, pp. 2139-2164.
"Properties of X-rays", [retrieved on Aug. 31, 2017]. Retrieved from the Internet <URL: https://web.stanford.edu/group/glam/xlab/MatSci162_172/LectureNotes/01_Properties%20&%20Safety.pdf.
Riess, Christian et al "On Filtration for High-Energy Phase-Contrast X-ray Imaging", Proceedings, vol. 9412, Medical Imaging 2015: Physics of Medical Imaging; 941251 (2015).

\* cited by examiner

ACHROMATIC PHASE-CONTRAST IMAGING

FIELD OF THE INVENTION

The invention relates to achromatic phase-contrast imaging. In particular, the invention relates to a phase-contrast imaging apparatus for examining an object of interest, to a phase grating module for a phase contrast imaging apparatus and to a method of phase-contrast imaging for examining an object of interest.

BACKGROUND OF THE INVENTION

A severe limitation of grating based phase-contrast imaging systems, such as X-ray phase-contrast imaging systems for hard X-rays (15 to 30 keV), is that the system usually has to be designed for a certain mean energy $E_M$. Consequently, such systems will use phase-information in a more or less narrow band with a bandwidth of approximately 10% around the design-energy. For mammography systems typical spectra are much wider in bandwidth and the necessary choice of design-energy may significantly limit the fraction of x-ray power in the spectrum contributing to the phase-contrast imaging process.

SUMMARY OF THE INVENTION

It may be desirable to provide for an imaging system and method which uses a larger amount of the power available.

The invention relates to a phase-contrast imaging apparatus for examining an object of interest, to a phase grating module for a phase contrast imaging apparatus and to a method of phase-contrast imaging for examining an object of interest according to the features of the independent claims. Further features of exemplary embodiments of the invention are stated in the dependent claims.

It should be noted that the features which are in the following described for example with respect to the imaging apparatus or the module may also be implemented as method steps in the method according to exemplary embodiments of the invention and vice versa.

According to an exemplary embodiment of the invention, a phase-contrast imaging apparatus for examining an object of interest is provided, the apparatus comprising a source, a detector, a first phase grating (G1) and a second phase grating (G1'). The source is designed for generating a beam of radiation, in particular a beam of polychromatic X-rays. The detector is adapted for detecting the radiation after it has passed the object of interest and the first and the second phase gratings. The first phase grating is positioned between the source and the detector and has a first pitch and the second phase grating is also positioned between the source and the detector and has a second pitch, wherein the first pitch differs from the second pitch.

In other words, an achromatic phase-contrast imaging apparatus may be provided which uses at least two different phase gratings. This allows for the use of phase-information over a wider energy band for example in X-ray based differential phase-contrast imaging (DPCI).

Furthermore, the two phase gratings may have a different height, i.e. different thicknesses and/or trenches of different depths.

According to another exemplary embodiment of the present invention, the second phase grating is positioned adjacent to the first phase grating. For example, the two phase gratings are forming an integral part of a phase grating module.

According to another exemplary embodiment of the present invention, the second phase grating is positioned a predetermined distance from the first phase grating. This may also help to use phase-contrast information over a larger bandwidth than the usual 10%.

It should be noted that further phase gratings may be provided which all differ in their respective pitch and/or heights.

According to another exemplary embodiment of the present invention, a third grating is provided, wherein the third grating is an absorption grating which forms part of the detector or is positioned right before the detector. The third grating has a third pitch and/or height which is different from the first pitch and the second pitch of the first and second phase gratings.

According to another exemplary embodiment of the present invention, the imaging apparatus further comprises a fourth grating positioned between the source and the object of interest, wherein the fourth grating is an absorption grating and has a fourth pitch which is different from the first pitch and the second pitch.

This grating is used to generate coherent x-rays. The x-rays from a tube (even each monochromatic component cannot be used for interference because of the lack of coherence. This grating "generates" "coherent" rays by slicing the source into smaller pieces (line sources).

According to another exemplary embodiment of the present invention, the first pitch corresponds to a first energy of the radiation emitted by the source. The second pitch corresponds to a second energy of the radiation. Furthermore, the first phase grating has a Talbot distance for the first energy and the second phase grating has the same Talbot distance for the second energy.

Thus, the intensities for the two different design energies (first energy and second energy, $E_1$, $E_2$) are superimposed at the location of the detector for the same value of the Talbot distance $d_T$.

According to another exemplary embodiment of the present invention, the absorption grating G2 has a third pitch equal to the harmonic mean of the pitches of the two gratings of 2×(first pitch*second pitch)/(first pitch+second pitch).

A superposition of two intensity modulations will therefore occur at the detector. This will result in a beating phenomenon with a large and a small frequency component. The phase retrieval process will have to take the effect of the beatings into account. In the conventional system (Pfeiffer et al.) the modulation has a trigonometric form. A superposition of two such profiles with different frequency occurs in the more general case scope described here, which are nevertheless detectable if the phase stepping is performed over one entire period of the beating.

According to another exemplary embodiment of the present invention, the first energy is two times the second energy.

According to another exemplary embodiment of the present invention, the imaging apparatus is adapted as a mammography imaging apparatus for examination of the female breast.

According to another exemplary embodiment of the present invention, the source is an X-ray source, wherein the apparatus is adapted as an X-ray based differential contrast imaging apparatus.

According to another exemplary embodiment of the present invention, the imaging apparatus is adapted as an optical imaging apparatus, where the beam of energy used for probing the object is an optical radiation beam with a wavelength within the range of for example 400 to 1400 nm.

According to another exemplary embodiment of the present invention, a phase grating module for a phase contrast imaging apparatus for examining an object of interest is provided, the module comprising: a first phase grating for being positioned between a source of the imaging apparatus and a detector of the imaging apparatus, wherein the first phase grating has a first pitch and a second phase grating for being positioned between the source and the detector, wherein the second phase grating has a second pitch, wherein the first pitch is different from the second pitch.

The phase grating module may be designed such that the distance between the first and second phase gratings can be adjusted electronically by a control unit. Furthermore, both phase gratings may be replaced by different phase gratings or further phase gratings may be added to the module. According to an exemplary embodiment of the present invention, the module comprises three different phase gratings which can all be moved by the control unit in order to adjust their distance to each other.

According to another exemplary embodiment of the present invention, a method of phase-contrast imaging for examining an object of interest is provided, the method comprising the steps of generating a beam of radiation by a source, using a first phase grating having a first pitch and being positioned between the source and a detector for creating a first Talbot image corresponding to a first energy of the radiation at the Talbot distance from the first grating, using a second phase grating having a second pitch and being positioned between the source and the detector for creating a second Talbot image corresponding to a second energy of the radiation at the same Talbot distance from the first grating, and detecting, by a detector, the beam after it has passed the object of interest and the first and second gratings, wherein the first pitch is different from the second pitch.

According to another exemplary embodiment of the present invention, the method further comprises the step of using a third phase grating having a third pitch and being positioned between the source and the detector for creating a third Talbot image corresponding to a third energy of the radiation at the same Talbot distance from the first grating, wherein the third pitch is different from the first pitch and the second pitch.

An absorption grating G0 may be used for generating the coherence, and another absorption grating G2 may be used for detecting the fringes altogether. Conventional detectors may not offer high enough spatial resolution to directly detect the fringes.

According to another exemplary embodiment of the present invention, the method further comprises the step of using an absorption grating having a pitch which is equal to equal to the harmonic mean of the pitches of the two gratings 2×(first pitch*second pitch)/(first pitch+second pitch), wherein the absorption grating is part of the detector.

It may be seen as the gist according to an exemplary embodiment of the invention, that a further phase grating G1' is placed just before or behind the first phase grating G1 with a pitch different from the pitch of G1. The idea is to superimpose the intensities for two different design energies $E_1$ and $E_2$ at the location of the detector for the same value of the Talbot distance.

The invention is based on the observation that the phase shift of a given slab of material is inversely proportional to the energy of the radiation (for X-rays). Therefore, a phase grating designed to generate a regular phase shift pattern of height $\pi$ at a design energy $E_2$ will result in a phase shift of $2\pi$ for half the design energy. Thus, there may be no measurable effect on the monochromatic wave component with energy $E_1=E_2/2$. In order to design a system which also yields phase-contrast for $E_1$ another grating G1' is placed right behind (or in front of) G1.

If the second phase grating G1' is removed, an additional image can be acquired which then can be subtracted from the original image generated by using both phase gratings in order to resolve $E_2$. It should be noted that distinguishing between the contributions from the two energies may also be possible during the phase stepping with both gratings G1 and G1' present.

These and other aspects of the present invention will become apparent from and elucidated with reference to the embodiments described hereinafter.

Exemplary embodiments of the present invention will be described in the following, with reference to the following drawings.

DETAILED DESCRIPTION OF EMBODIMENTS

Figure 1:
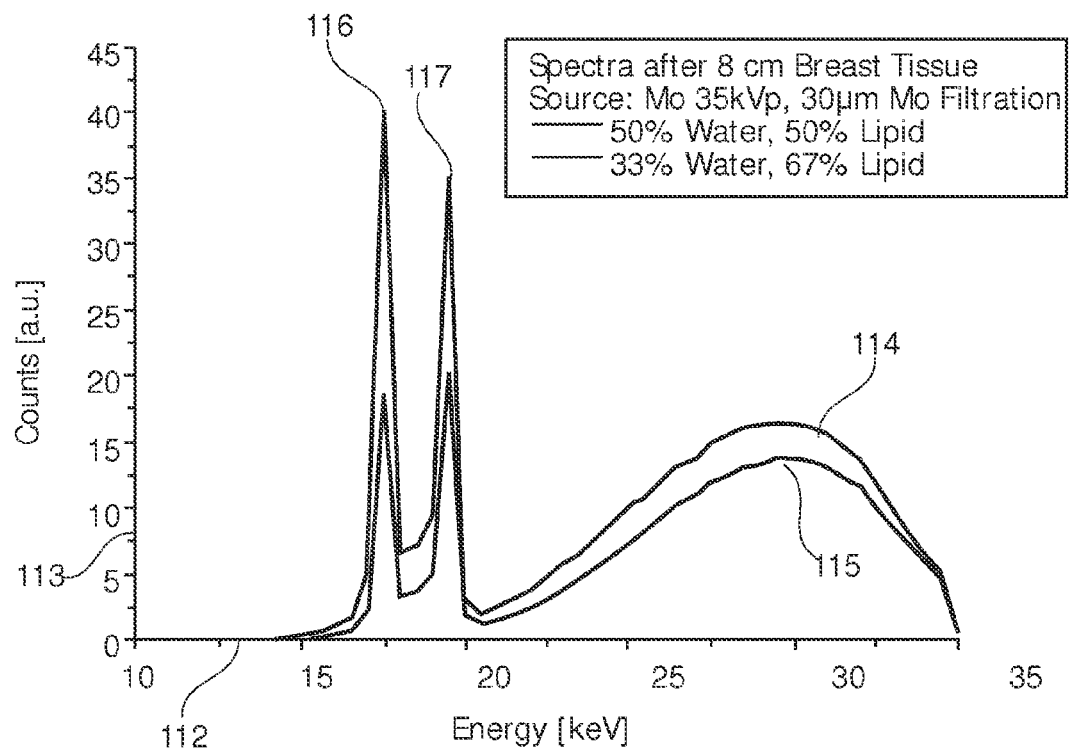
FIG. 1 shows two X-ray spectra after 8 cm breast tissue.

The illustration in the drawings is schematically and not to scale. In different drawings, similar or identical elements are provided with the same reference numerals.

FIG. 1 shows two X-ray spectra after the X-rays have passed 8 cm of breast tissue. The X-ray source is Mo (Molybdenum) at 35 keV with 13 µm Mo filtration.

The horizontal axis 112 shows the energy of the X-rays ranging from 10 keV to 35 keV. The vertical axis 113 shows the number of counts in arbitrary units.

The upper curve 114 shows the number of counts in case the breast tissue contains 33% water and 67% lipid and the lower curve 115 shows the number of counts when the breast tissue contains 50% water and 50% lipid.

Two characteristic peaks 116, 117 can be seen at approximately 17.3 keV and 17.4 keV and 19.7 keV and 20.0 keV, respectively.

As can be seen from the spectra depicted in FIG. 1, the apparatus according to the invention may advantageously use both peaks 116, 117 for imaging, thereby using a large amount of the power available for the phase-contrast imaging process.

Figure 2:
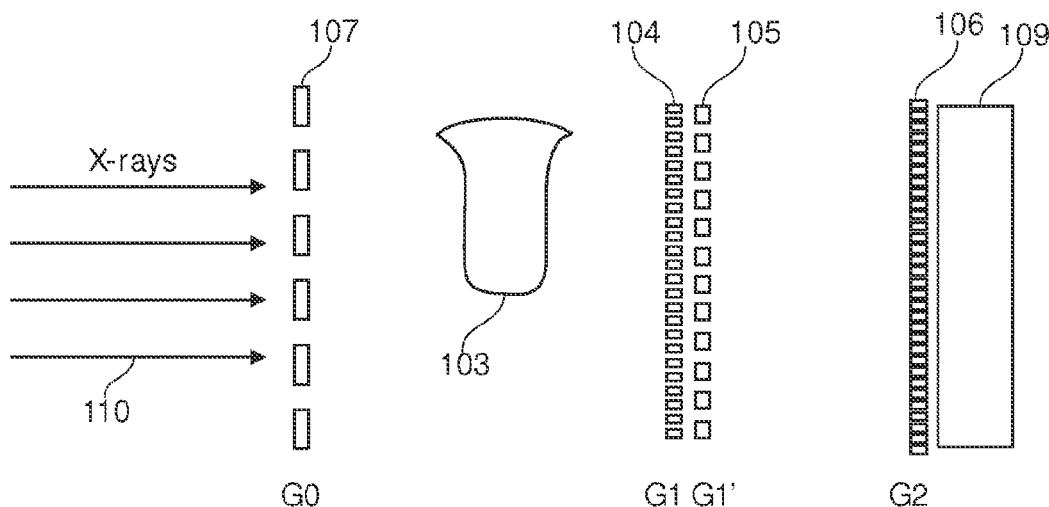
FIG. 2 shows a grating and detector setup according to an exemplary embodiment of the present invention.

FIG. 2 shows a measurement setup comprising four gratings and a radiation detector 109 according to an exemplary embodiment of the present invention.

The X-rays or other rays of electromagnetic energy 110, for example emitted by an X-ray source (not depicted in FIG. 2), first pass the initial grating 107 (G0). Then, the rays pass the object of interest 103, for example a breast or another kind of tissue to be examined. Then, the rays pass the first and second phase gratings 104, 105 (G1, G1'), which are arranged before the detector 109 and a fourth grating 106, which is an absorption grating (G2). The distances between the two phase gratings G1, G1' and the detector 109 corresponds to the respective Talbot distance of each phase grating corresponding to different design energies.

The imaging method according to the invention is based on the method by Pfeiffer et al., "Phase retrieval and differential phase-contrast imaging with low-brilliance X-ray source", Nature Physics, 2006, using three different gratings G0, G1 and G2 in order to detect phase shifts introduced by an object by observing interference fringes with the use of the absorption gratings G2 on a detector.

The additional piece of hardware consists of a phase grating G1' which is placed right behind (or in front of) the standard phase grating G1 with a pitch $p_2$ different from the pitch $p_1$ of G1. The setup is such that the Talbot images for two different design energies $E_1$ and $E_2$ at the location of the detector are superimposed at the same location, i.e. for (more or less) the same value of the Talbot distance $d_T$.

The setup is based on the observation that the phase shift of a given slab of material is inversely proportional to the X-ray energy. Therefore, a phase grating designed to generate a regular phase shift pattern of height $\pi$ at a design energy $E_2$ will result in a phase shift of $2\pi$ for half the design energy. Thus, there will be no measurable effect on the monochromatic wave component with energy $E_1 = E_2/2$. However, since another grating G1' is put right behind (or in front of) G1, the imaging system also yields phase-contrast information for the first energy $E_1$.

Beating phenomena will be observed in the intensities measured by the detector but the Talbot distance $d_T$ will be the same for both design energies $E_1$ and $E_2$.

In the following it is assumed that the imaging system has a Talbot distance $d_T$ both for $E_1 = E_2/2$ and $E_2$ by using two phase gratings G1 and G1' with pitch $p_1$ and $p_2$, respectively. The phase shift $\pi$ generated by G1 for the energy $E_2$ result in a shift of $2\pi$ at the energy $E_1$. The Talbot effect for the energy $E_1$ would be observable at a distance $d_T = p_2^2/8\lambda_1$. The height of G1' is designed to give a phase shift of $\pi$ at the energy $E_1$. The superposition of two different phase grids at a single location will yield a beating effect in the phase shift with a high frequency corresponding to a pitch of $p_{eff} = 2p_1p_2/(p_1+p_2)$. Talbot images of this periodic structure will be observed at the same distance $d_T$ if $$\frac{p_2}{p_1} = 2\sqrt{\frac{E_2}{E_1}} - 1.$$

For $E_2/E_1 = 2$ this gives $p_2/p_1 \cong 1.8$ and $p_{eff}/p_1 \cong 1.3$. The absorption grating may be fabricated with a pitch of $p_{eff}/2$ to step the fringes generated by the wave fields at $E_1$ and $E_2$ individually. The phase retrieval procedure may also be modified in order to account for the beating phenomenon of two monochromatic components. In other words, since two modulated signals corresponding to two energies are superimposed, two phases have to be determined from the intensity modulation.

Although the method may work best for ratios of design energies of 2, in principle it can also be applied to other ratios with somewhat decreasing fringe visibility.

Finally, it may also be possible to superimpose the Talbot images of more than two coherent monochromatic components at one and the same distance from the first phase grating by using more than one additional phase grating.

Figure 3:
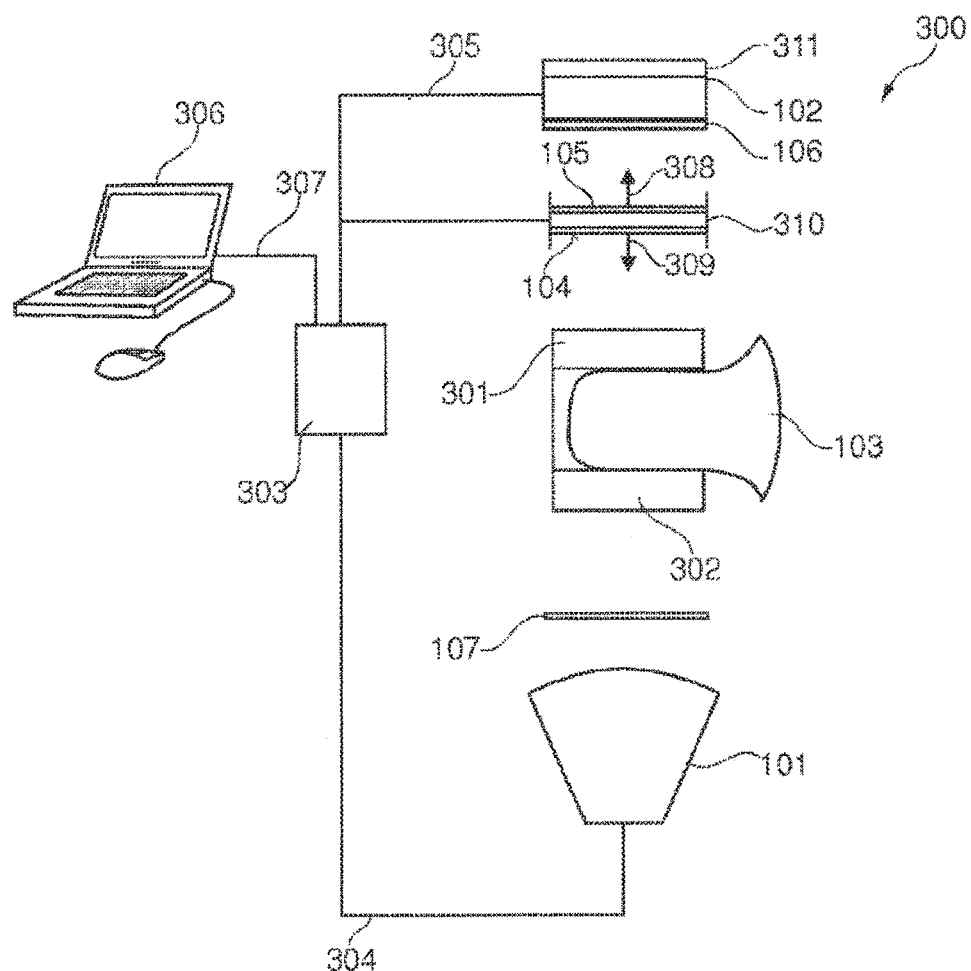
FIG. 3 shows an imaging system according to an exemplary embodiment of the present invention.

FIG. 3 shows in imaging system 300 according to an exemplary embodiment of the invention. The imaging system 300 depicted in FIG. 3 may be adapted as an optical imaging system or an X-ray imaging system, for example a mammography imaging system. The object of interest 103 may be a breast of a patient which is disposed between two pressure plates 301, 302 for applying pressure to the patient's breast.

The source 101 may be an X-ray source or, for instance, an optical energy source.

The radiation emitted by the source 101 first passes the grating 107 and then the object of interest to be imaged 103. After that, the radiation passes the two or more phase gratings 104, 105. The two or more phase gratings 104, 105 may be integrated in a corresponding housing 310 and may thus form a module. The module is connected to the control unit 303 such that the gratings 105, 104 can be moved upwards and downwards along arrows 308, 309.

Furthermore, a detector 102 with an absorption grating 106 is provided for detecting the radiation. Both the source 101 and the detector 102 are connected to the control unit 303 via the lines 304, 305, respectively.

The detector 102 comprises a Talbot interferometer 311.

Furthermore, a data line 307 connects the control unit 303 to an input and output device 306, which can be used for inputting control information for controlling the imaging system 300 and which can also be used for outputting visual information relating to the final image.

An advantage of the imaging system depicted in FIG. 3 is that a relatively high portion of the X-ray spectrum can be used for the phase-contrast imaging process by using one or more additional phase gratings.

Figure 4:
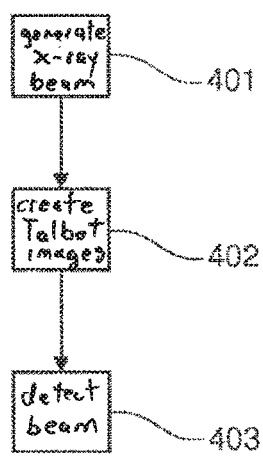
FIG. 4 shows a flow-chart of a method according to an exemplary embodiment of the present invention.

FIG. 4 shows a flow-chart of a method according to an exemplary embodiment of the invention. In step 401 a beam of radiation is generated by a source, for example an X-ray source. Then, in step 402 two phase gratings are used for creating two Talbot images corresponding to different energies of the radiation at a Talbot distance from the first phase grating. Then, in step 403, the final beam is detected after it has passed the object of interest and the two phase gratings.

Figure 5:
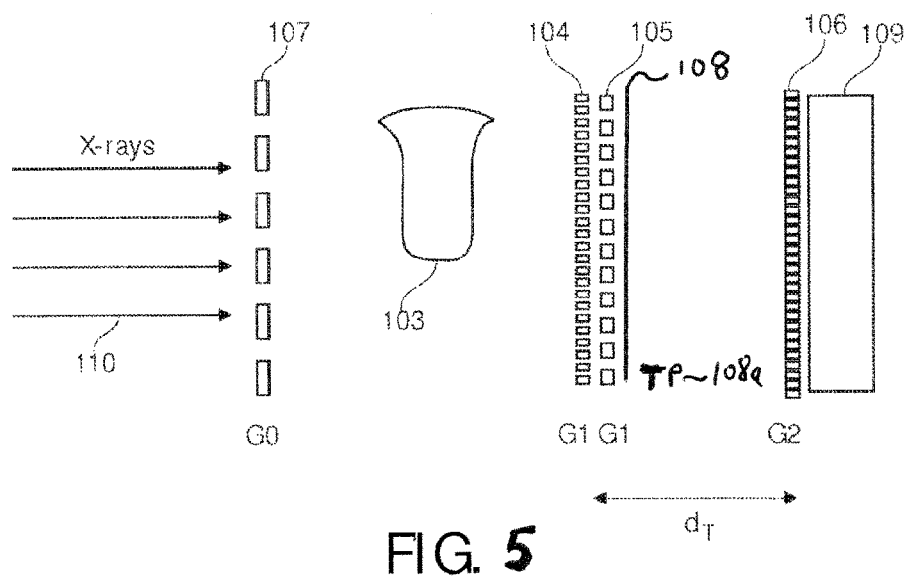
FIG. 5 shows another grating and detector setup according to an exemplary embodiment of the present invention.

As seen from FIG. 5, in an embodiment of the invention and as mentioned earlier, the method further comprises the step of using a third phase grating 108 (which serves as a fifth grating—the fourth grating 106 being the absorption grating) having a third pitch (TP) 108a (not demonstrated in FIG. 5) and being positioned between the source (not depicted in FIG. 5) and the detector 109 for creating a third Talbot image corresponding to the third energy of the radiation at the same Talbot distance $d_T$ from the first grating 104, wherein the third pitch is different from the first pitch and the second pitch.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A phase contrast imaging apparatus for examining an object of interest, the apparatus comprising:
  a source for generating a beam of radiation;
  a detector for detecting the radiation after the radiation has passed the object of interest, said detector comprising a Talbot interferometer;
  a first phase grating positioned between the source and the detector and having a first pitch; and
  a second phase grating positioned between the source and the detector and having a second pitch, wherein the first pitch is different from the second pitch; and
  a third grating; wherein the third grating is an absorption grating which is positioned in front of the detector; and wherein the third grating has a third pitch which is different from the first pitch and the second pitch, wherein the absorption grating has a third pitch equal to the harmonic mean of the pitches of the two phase gratings which equates to the ratio of two times the product of the first pitch and the second pitch to the sum of the first pitch and the second pitch, wherein said source is an X-ray source, said detector is an X-ray detector, and said radiation is X-ray radiation.

2. A method of phase contrast imaging for examining an object of interest, the method comprising the acts of: generating a beam of X-ray radiation by an X-ray source; using a first phase grating having a first pitch and being positioned between the X-ray source and an X-ray detector for creating a first Talbot image corresponding to a first energy of the radiation at a Talbot distance from the first phase grating; for a second phase grating that has a second pitch and is positioned so that, as viewed from the X-ray source to the X-ray detector, said second phase grating and said first phase grating are mutually overlapping spatially, using said second phase grating for creating a second Talbot image corresponding to a second energy of the radiation at the same Talbot distance from the first phase grating; detecting, by the X-ray detector, the beam after the beam has passed through the object of interest and the first and second phase gratings; wherein the first pitch is different from the second pitch, wherein the first energy is different from the second energy, and wherein the using of the first and second phase gratings entails using, for phase contrast imaging, correspondingly the first and second energies.

3. The method of claim 2, further comprising the acts of: using a third phase grating having a third pitch and being positioned between the X-ray source and the X-ray detector for creating a third Talbot image corresponding to a third energy of the radiation at the same Talbot distance from the first grating; wherein the third pitch is different from the first pitch and the second pitch; and using an absorption grating having a pitch equal to the harmonic mean of the pitches of the two phase gratings which equates to the ratio of two times the product of the first pitch and the second pitch to the sum of the first pitch and the second pitch; wherein the absorption grating is positioned before the X-ray detector.

4. A phase grating module for a phase contrast imaging apparatus for examining an object of interest, said apparatus comprising an X-ray source and an X-ray detector, the module comprising:

a first phase grating for being positioned between said X-ray source of the imaging apparatus and said X-ray detector of the imaging apparatus, wherein the first phase grating has a first pitch; and a second phase grating for being positioned between said X-ray source and said X-ray detector overlappingly with said first phase grating such that incident radiation serially passes the gratings, wherein the second phase grating has a second pitch; wherein the first pitch is different from the second pitch, said gratings being concurrently housed adjacently, one right behind the other in said module, said gratings being substantially equidistant from said X-ray detector, the distance being a Talbot distance for each of said gratings based on correspondingly different design energies applicable to correspondingly the first and second phase gratings such that respective Talbot images are concurrently superimposed at said X-ray detector.

5. The phase grating module of claim 4, wherein said design energies are design energies of radiation propagated as a beam received for phase contrast imaging in said examining, wherein said Talbot distance for said first phase grating is based on a monochromatic wave component of said beam, and wherein said Talbot distance for said second phase grating is based on a monochromatic wave component of said beam that differs from the monochromatic wave component upon which said first Talbot distance is based.

6. The phase contrast imaging apparatus of claim 4, further comprising said phase grating module, and a control unit configured for moving a phase grating from among the first and second phase gratings so as to change a distance between said first and second phase gratings.

7. A phase contrast imaging apparatus for examining an object of interest, the apparatus comprising:

a source for generating a beam of radiation;

a detector for detecting the radiation after the radiation has passed the object of interest;

a first phase grating positioned between the source and the detector and having a first pitch;

a second phase grating positioned between the source and the detector and having a second pitch;

wherein the first pitch is different from the second pitch;

wherein the first pitch corresponds to a first energy of the radiation;

wherein the first pitch corresponds to a second energy of the radiation, the second energy being different from the first energy;

wherein said source is configured for providing both the first and said second energies as design energies, wherein the first phase grating has a Talbot distance for the first energy;

wherein the second phase grating has the same Talbot distance for the second energy; and wherein said apparatus is configured for phase contrast imaging and such that a point of incidence on said detector of said radiation that has passed through said object of interest is a point for which radiation arriving from said beam has passed in order: a) said object of interest; b) the first phase grating; and c) the second phase grating, wherein said source is an x-ray source, said detector is an X-ray detector, and said radiation is x-ray radiation.

8. The apparatus of claim 7, wherein said beam of radiation has a monochromatic wave component with said first energy, and said beam of radiation further has a monochromatic wave component with said second energy, the two monochromatic wave components being different from each other.

9. The phase contrast imaging apparatus of claim 8, configured for mammography imaging via the first and second design energies applied to correspondingly the first and second phase gratings such that respective Talbot images are concurrently superimposed at said detector.

10. The phase contrast imaging apparatus of claim 7, wherein said X-ray detector includes a Talbot interferometer for phase contrast imaging.

11. A phase contrast imaging apparatus for examining an object of interest, the apparatus comprising:

a source for generating a beam of radiation;

a detector for detecting the radiation after the radiation has passed the object of interest;

a first phase grating positioned between the source and the detector and having a first pitch;

a second phase grating positioned between the source and the detector and having a second pitch;

wherein the first pitch is different from the second pitch;
wherein the first pitch corresponds to a first energy of the radiation;
wherein the first pitch corresponds to a second energy of the radiation, the second energy being different from the first energy;
wherein said source is configured for providing both the first and said second energies as design energies;
wherein the first phase grating has a Talbot distance for the first energy;
wherein the second phase grating has the same Talbot distance for the second energy; and
wherein said apparatus is configured for phase contrast imaging and such that a point of incidence on said detector of said radiation that has passed through said object of interest is a point for which radiation arriving from said beam has passed in order: a) said object of interest; b) the first phase grating; and c) the second phase grating, wherein said source is an optical source, said radiation is optical radiation, and said beam is a beam of optical radiation with a wavelength between 400 and 1400 nanometers.

12. A phase contrast imaging apparatus for examining an object of interest, the apparatus comprising:
a source for generating a beam of radiation;
a detector for detecting the radiation after the radiation has passed the object of interest;
a first phase grating positioned between the source and the detector and having a first pitch;
a second phase grating positioned between the source and the detector and having a second pitch;
wherein the first pitch is different from the second pitch;
wherein the first pitch corresponds to a first energy of the radiation;
wherein the second pitch corresponds to a second energy of the radiation;
wherein the first phase grating has a Talbot distance for the first energy;
wherein the second phase grating has the same Talbot distance for the second energy; and
wherein the first energy is two times the second energy, wherein said source is an x-ray source, said detector is an X-ray detector, and said radiation is x-ray radiation.

13. A phase contrast imaging apparatus for examining an object of interest, said apparatus comprising:
a phase grating module and an image processor, the module comprising:
a first phase grating positioned between a source of the imaging apparatus and a detector of the imaging apparatus, wherein the first phase grating has a first pitch,
a second phase grating positioned between the source and the detector overlappingly with said first phase grating such that incident radiation serially passes the gratings, wherein the second phase grating has a second pitch; wherein the first pitch is different from the second pitch;
wherein a grating from among said gratings has an unfocused geometry; and
wherein said gratings are concurrently housed adjacently, one right behind the other in said module,
said apparatus being configured for, via said image processor, phase contrast imaging that entrails phase retrieval that takes into account beating resulting from superimposition of intensities for two different design energies, one of the energies corresponding to said first pitch, the other energy corresponding to said second pitch,
wherein said source is an x-ray source, said detector is an X-ray detector, and said radiation is x-ray radiation.

14. A phase contrast imaging apparatus for examining an object of interest, the apparatus comprising:
a source for generating a beam of radiation;
a detector for detecting the radiation after the radiation has passed the object of interest, said detector comprising a Talbot interferometer;
a first phase grating positioned between the source and the detector and having a first pitch;
a second phase grating positioned between the source and the detector and having a second pitch;
wherein the first pitch is different from the second pitch, a radio of the second to the first pitch being equal to one less than twice the square root of an energy ratio, said energy ratio being a ratio of an energy corresponding to said second pitch to an energy corresponding to said first pitch, wherein said source is an x-ray source, said detector is an X-ray detector, and said radiation is x-ray radiation.

* * * * *